United States Patent
Riahi et al.

(10) Patent No.: US 9,988,932 B2
(45) Date of Patent: Jun. 5, 2018

(54) BI-CAST TURBINE NOZZLES AND METHODS FOR COOLING SLIP JOINTS THEREIN

(71) Applicant: HONEYWELL INTERNATIONAL INC., Morristown, NJ (US)

(72) Inventors: Ardeshir Riahi, Scottsdale, AZ (US); Lorenzo Crosatti, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 660 days.

(21) Appl. No.: 14/099,289

(22) Filed: Dec. 6, 2013

(65) Prior Publication Data

US 2015/0159513 A1 Jun. 11, 2015

(51) Int. Cl.
| | | |
|---|---|---|
| F01D 25/12 | (2006.01) | |
| F01D 5/14 | (2006.01) | |
| F01D 5/18 | (2006.01) | |
| F01D 5/22 | (2006.01) | |
| F01D 9/04 | (2006.01) | |
| F01D 9/00 | (2006.01) | |

(52) U.S. Cl.
CPC ............ F01D 25/12 (2013.01); F01D 5/14 (2013.01); F01D 5/145 (2013.01); F01D 5/18 (2013.01); F01D 5/186 (2013.01); F01D 5/22 (2013.01); F01D 9/041 (2013.01); F01D 9/042 (2013.01); F01D 9/00 (2013.01); Y02T 50/673 (2013.01); Y02T 50/676 (2013.01)

(58) Field of Classification Search
CPC . F01D 25/12; F01D 9/042; F01D 9/00; F01D 9/041; F01D 5/22; F01D 5/18; F01D 5/14; F01D 5/145; F01D 5/186
See application file for complete search history.

(56) References Cited

U.S. PATENT DOCUMENTS

| | | |
|---|---|---|
| 3,824,030 A | 7/1974 | DeFeo |
| 4,137,619 A | 2/1979 | Beltran et al. |
| 4,283,822 A | 8/1981 | Muth et al. |
| 4,728,258 A | 3/1988 | Blazek et al. |

(Continued)

FOREIGN PATENT DOCUMENTS

| | | |
|---|---|---|
| DE | 10346240 A1 | 4/2005 |
| EP | 2415969 A1 | 2/2012 |
| WO | 2014016149 A1 | 1/2014 |

OTHER PUBLICATIONS

EP Extended Search Report for Application No. EP 15158094.1-1610 dated Oct. 27, 2015.

(Continued)

*Primary Examiner* — Igor Kershteyn
*Assistant Examiner* — Brian P Wolcott
(74) *Attorney, Agent, or Firm* — Lorenz & Kopf, LLP

(57) ABSTRACT

Bi-cast turbine nozzles and methods for cooling the same are provided. The bi-cast turbine nozzle comprises an endwall. A vane is coupled to the endwall. The vane comprises an end portion and a leading edge and a trailing edge interconnected by a pressure sidewall and a suction sidewall. A slip joint is provided between the end portion and the endwall. A plurality of cooling holes is defined through the endwall. The plurality of cooling holes is disposed adjacent the periphery of the slip joint along the pressure sidewall of the vane and in proximity to the leading edge of the vane.

9 Claims, 7 Drawing Sheets

(56) References Cited

U.S. PATENT DOCUMENTS

| | | | |
|---|---|---|---|
| 4,863,348 A | 9/1989 | Weinhold | |
| 5,069,265 A * | 12/1991 | Blazek | B22C 9/04 164/10 |
| 5,630,700 A * | 5/1997 | Olsen | F01D 5/189 415/134 |
| 5,785,492 A | 7/1998 | Belsom et al. | |
| 6,354,797 B1 | 3/2002 | Heyward et al. | |
| 6,616,405 B2 * | 9/2003 | Torii | F01D 5/186 415/914 |
| 7,004,720 B2 | 2/2006 | Synnott et al. | |
| 7,097,417 B2 * | 8/2006 | Liang | F01D 5/145 415/115 |
| 7,204,019 B2 | 4/2007 | Ducotey, Jr. et al. | |
| 7,249,933 B2 | 7/2007 | Lee et al. | |
| 7,621,718 B1 | 11/2009 | Liang | |
| 7,832,986 B2 | 11/2010 | Baker et al. | |
| 8,047,771 B2 | 11/2011 | Tucker et al. | |
| 8,070,422 B1 | 12/2011 | Liang | |
| 8,113,779 B1 | 2/2012 | Liang | |
| 8,215,900 B2 | 7/2012 | Morrison | |
| 8,459,935 B1 | 6/2013 | Liang | |
| 2005/0175444 A1 | 8/2005 | Liang | |
| 2008/0050223 A1 | 2/2008 | Liang | |
| 2008/0085190 A1 | 4/2008 | Liang | |
| 2010/0054930 A1 | 3/2010 | Morrison | |
| 2011/0243724 A1 * | 10/2011 | Campbell | B22D 19/00 415/208.2 |
| 2011/0299999 A1 | 12/2011 | James | |
| 2015/0198048 A1 | 7/2015 | Handler | |

OTHER PUBLICATIONS

EP Extended Search Report for Application No. EP 14185022.2 dated Apr. 9, 2015.
Rolls Royce; Turbines; Retrieved from Internet [http://www.rolls-royce.com/about/technology/gas_turbine_tech/turbines.jsp] Mar. 12, 2014.
Nicholls, J.R.; Advances in Coating Design for High-Performance Gas Turbines; MRS Bulletin, vol. 28, Issue 09, Sep. 2003, pp. 659-670; Materials Research Society 2003. [Retrieved from Internet on Oct. 8, 2013; URL: http://journals.cambridge.org/action/displayAbstract?fromPage=online&aid=7965505.].
Asthana, R., et al.; Casting and Solidification; Acedemic Press Materials Processing and Manufacturing Science, 2006, pp. 57-165. [Retrieved from Internet on Oct. 8, 2013; URL: http://www.sciencedirect.com/science/article/pii/B9780750677165500042.].
EP Examination Report for Application No. 15158094.1-1610 dated Mar. 2, 2017.
USPTO Office Action for U.S. Appl. No. 14/283,104 dated Jan. 9, 2017.
USPTO Office Action for U.S. Appl. No. 14/283,104 dated Jul. 12, 2017.
USPTO Notice of Allowance for U.S. Appl. No. 14/283,104 dated Oct. 2, 2017.

* cited by examiner

BI-CAST TURBINE NOZZLES AND METHODS FOR COOLING SLIP JOINTS THEREIN

STATEMENT REGARDING FEDERALLY SPONSORED RESEARCH OR DEVELOPMENT

This invention was made with Government support under W911W6-08-2-0001 awarded the U.S. Army. The Government has certain rights in this invention.

TECHNICAL FIELD

The present invention generally relates to gas turbine engines, and more particularly relates to bi-cast turbine nozzles and methods for cooling slip joints therein.

BACKGROUND

Gas turbine engines are generally known in the art and used in a wide range of applications, such as propulsion engines and auxiliary power unit engines for aircraft. In a typical configuration, a turbine section of the gas turbine engine includes a turbine nozzle, etc. A turbine nozzle comprises an annular array of stationary airfoils (also referred to herein as "vanes") that extend between annular endwalls. In the gas turbine engine, hot combustion gases from a combustion section in the gas turbine engine are directed against the annular array of vanes. When the vanes are heated faster or hotter than the endwalls, the vanes become susceptible to large thermal compressive stresses because the vanes tend to expand but are constrained by the endwalls. Therefore, conventional bi-cast turbine nozzles include a slip joint and associated space between an end portion of each vane in the annular array and the adjacent endwall to accommodate thermal expansion of the vanes. The opposing end portion of each vane is mechanically anchored into an opposing endwall. The slip joint, when in an open condition, forms a gap along a pressure sidewall of the vane and an opposing gap along a suction sidewall of the vane.

While the slip joint between the end portion of each of the vanes and the adjacent endwall in the bi-cast turbine nozzle is generally provided to accommodate thermal expansion of the vanes, the slip joints can undesirably allow for hot combustion gas ingestion from the pressure side of the vanes, into the associated space, and onto the suction side of the vanes. Such hot combustion gas ingestion can result in aerodynamic performance degradation and oxidation damage to the vanes and adjacent endwall at the slip joints, causing material recession of the vanes and adjacent endwall. As the size of the gaps between the end portion of the vanes and adjacent endwall at the slip joint increases due to material recession, the amount of hot gas ingestion increases, resulting in still higher aerodynamic performance degradation and even more oxidation damage, continuing to cause even more recession.

Film cooling of vanes is a widely used technique that helps to maintain material temperatures within acceptable limits. With film cooling of vanes, air is extracted from a compressor section of the gas turbine engine and forced through internal cooling passages within the vanes before being ejected through a showerhead or other film cooling holes in the vane onto the external wall surfaces of the vane. The cooling gas ejected from these film cooling holes forms a film layer of cooling gas on the external wall surfaces to protect the vane from the hot combustion gases by substantially reducing heat transfer from the hot combustion gases to the vane skin as the cooling gas is at a lower temperature than the hot combustion gas. Film cooling of endwalls using endwall film cooling holes is also known. Cooling film blow-off (i.e., separation of the cooling film layer from the vane and/or endwall external wall surfaces) may, however, substantially impede formation of the film layer of cooling gas against the external wall surfaces, resulting in lower overall vane/endwall cooling effectiveness. In addition, neither vane film cooling nor endwall film cooling sufficiently cool the slip joint of the bi-cast turbine nozzle to avoid the aerodynamic performance degradation and oxidation damage that are caused by the hot gas ingestion through the slip joints and through the associated space in the endwall.

Hence, there is a need to substantially prevent oxidation damage caused by hot gas ingestion at the slip joints of bi-cast turbine nozzles, to thereby maintain aerodynamic performance and operative life of the bi-cast turbine nozzle. It is also needed to mitigate cooling film blow-off, thereby resulting in higher overall cooling effectiveness. Furthermore, other desirable features and characteristics of the present invention will become apparent from the subsequent detailed description of the present invention and the appended claims, taken in conjunction with the accompanying drawings and this background of the invention.

BRIEF SUMMARY

A bi-cast turbine nozzle is provided. In accordance with one exemplary embodiment, the bi-cast turbine nozzle comprises an endwall. A vane is slip coupled to the endwall. The vane comprises an end portion and a leading edge and a trailing edge interconnected by a pressure sidewall and a suction sidewall. A slip joint is provided between the end portion and the endwall. A plurality of cooling holes is defined through the endwall. The plurality of cooling holes defined through the endwall is disposed adjacent the periphery of the slip joint along the pressure sidewall of the vane and in proximity to the leading edge of the vane.

A bi-cast turbine nozzle for a gas turbine engine is provided in accordance with another exemplary embodiment of the present invention. The bi-cast turbine nozzle comprises a pair of endwalls and a plurality of vanes extending between the pair of endwalls. Each vane of the plurality of vanes comprises a leading edge and a trailing edge interconnected by a pressure sidewall and a suction sidewall and an end portion and an opposing end portion. A slip joint is provided between the end portion and an adjacent endwall of the pair of endwalls. The opposing end portion is anchored to the other endwall of the pair of endwalls. A plurality of cooling holes is defined through the adjacent endwall. The plurality of cooling holes is disposed adjacent the periphery of the slip joint, along the pressure sidewall of the vane and in proximity to the leading edge of the vane.

A method is provided for cooling a slip joint in a bi-cast turbine nozzle in accordance with yet another exemplary embodiment of the present invention. The bi-cast turbine nozzle comprises a vane coupled to an endwall by the slip joint. The method comprises extracting cooling gas flow from an exit of a compressor of a gas turbine engine. The cooling gas flow is suitable in quantity to cool a combustion gas flow through the slip joint. The cooling gas flow is directed through a plurality of cooling holes in the endwall to mix with the combustion gas flow. The plurality of cooling holes is disposed adjacent the periphery of the slip joint along a pressure sidewall of the vane and in proximity to a leading edge of the vane.

Furthermore, other desirable features and characteristics of the bi-cast turbine nozzles and methods for cooling the same will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to bi-cast turbine nozzles and methods for cooling slip joints therein. The bi-cast turbine nozzle comprises an annular array of stationary airfoils (i.e., vanes) extending between a pair of endwalls. Each vane has an end portion slip coupled by a slip joint to an endwall of the pair of endwalls. The slip joints accommodate differential thermal expansion between the vanes and the endwalls. Exemplary embodiments of the present invention as described herein result in significantly reducing the temperature at the slip joints and in improving overall cooling effectiveness so as to substantially prevent aerodynamic performance degradation and oxidation damage to the vanes and endwalls, thereby resulting in decreasing material recession thereof and contributing to longer operative life of the bi-cast turbine nozzles. Cooling film blow-off at the endwall is also reduced.

Figure 1:
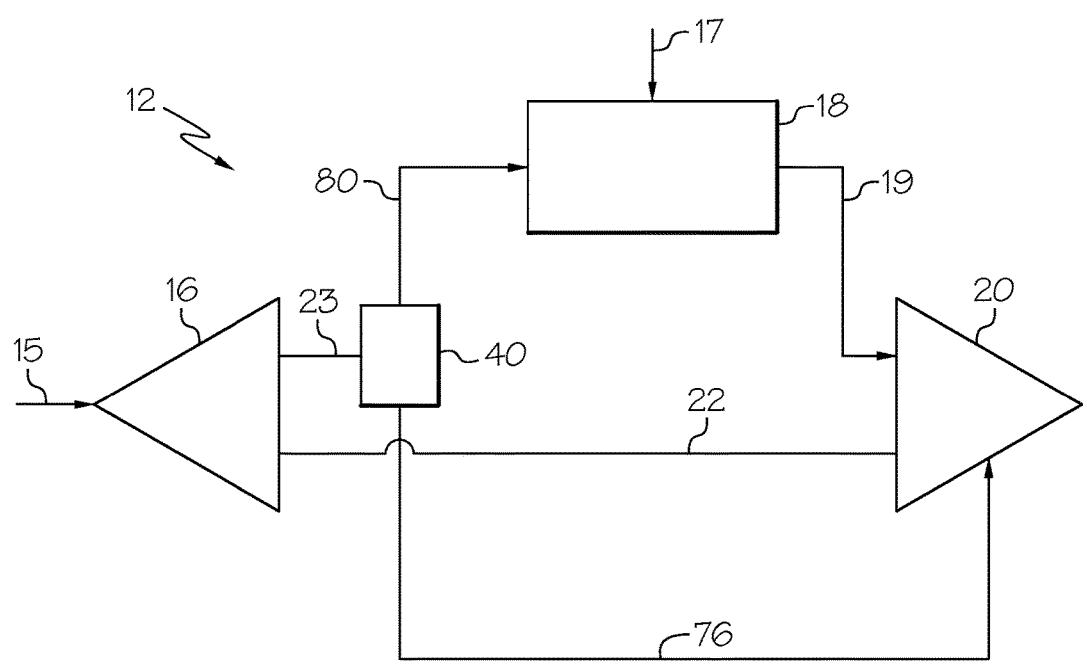
FIG. 1 is a simplified schematic illustration of an exemplary gas turbine engine.
Figure 2:
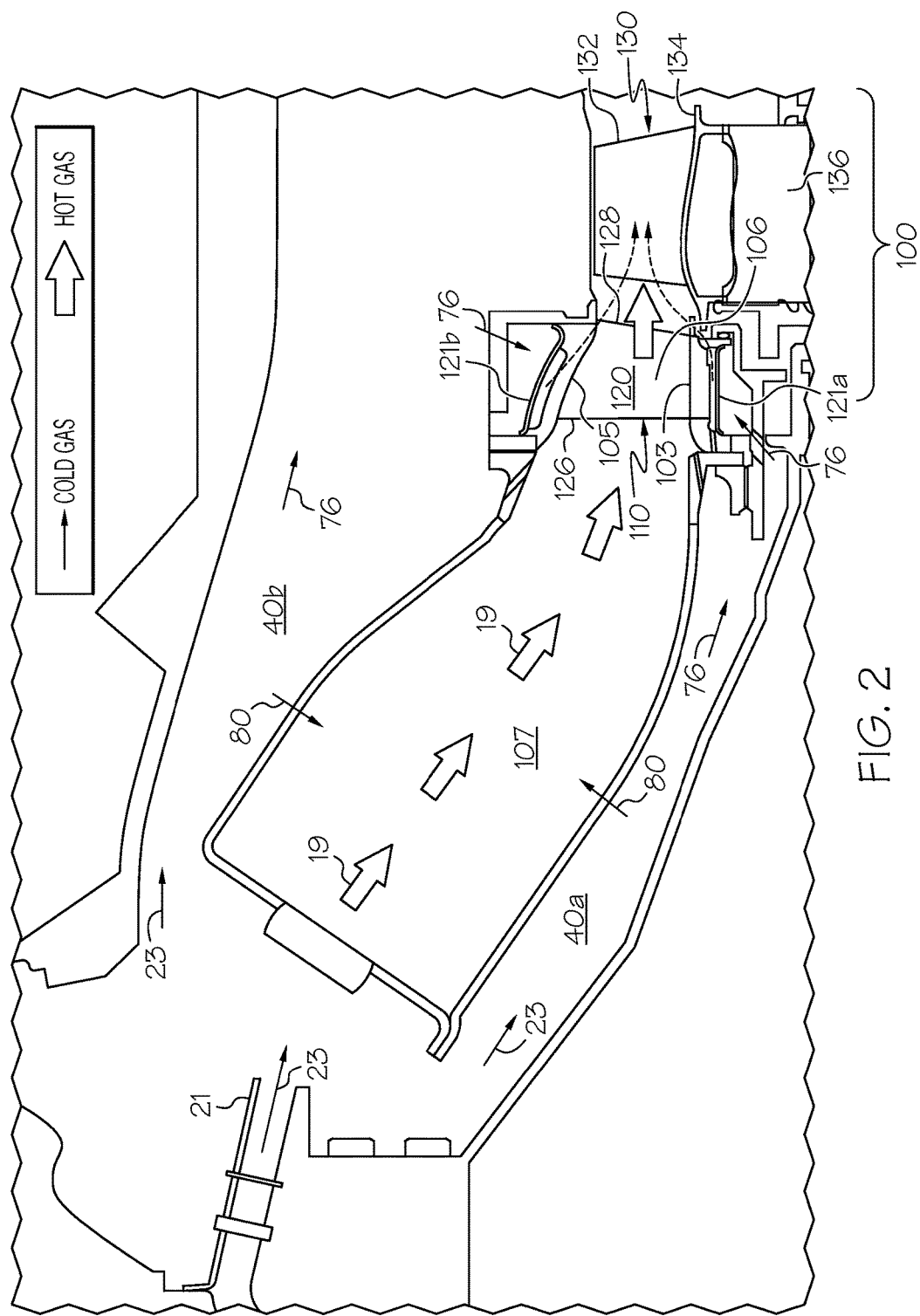
FIG. 2 is a partial cross-sectional view of the exemplary gas turbine engine of FIG. 1.

FIG. 1 is a simplified schematic illustration of a gas turbine engine 12. The gas turbine engine 12 includes a compressor 16, a combustor 18, and a turbine 20. The compressor 16, combustor 18, and turbine 20 are in flow communication. Compressor 16 and turbine 20 are coupled by a shaft 22. Shaft 22 rotates about an axis of symmetry, which is the centerline of the shaft 22. In operation, air 15 flows into the compressor 16 and compressed air 23 exits the compressor 16 through a compressor exit 21 (FIG. 2) and flows into a combustor plenum 40. A portion 80 of the compressed air 23 flows from the combustor plenum 40 (more particularly, through an inner diameter combustor plenum 40a and an outer diameter combustor plenum 40b as depicted in FIG. 2) (the inner diameter combustor plenum 40a and the outer diameter combustor plenum referred to collectively in FIG. 1 as "combustor plenum 40") to combustor 18 and is then mixed with fuel 17 provided by fuel nozzles (not shown) and ignited within the combustor 18 to produce hot combustion gases 19. The hot combustion gases 19 drive turbine 20 in the gas turbine engine 12, as hereinafter described. The remaining portion (hereinafter "cooling gas" 76) of the compressed air 23 flows from the combustor plenum 40 (more particularly, inner diameter and outer diameter combustor plenums 40a and 40b (FIG. 2)), to the turbine 20 to cool the turbine components including the bi-cast turbine nozzle 110 in a turbine section 100 (FIG. 2) of the gas turbine engine. The combustor plenum 40 is in flow communication with both the compressor 16 and turbine 20 (FIG. 1). It is to be understood that only one compressor and one turbine are shown for ease of illustration, but multiple compressors and turbines may be present in the gas turbine engine. It is also to be understood that while one exemplary configuration for cooling the turbine components including the bi-cast turbine nozzle with cooling gas has been described, the cooling gas may be supplied to the bi-cast turbine nozzle using other configurations.

FIG. 2 is a fragmented partial cross sectional view of the gas turbine engine 12 of FIG. 1 including the high pressure turbine (HPT) section 100. In general terms, the turbine section 100 of FIG. 2 is comprised of at least one turbine nozzle 110 with stationary airfoils (vanes) 120 and at least one turbine rotor 130 with rotor blades 132 (rotating airfoils). The vanes of the turbine nozzle 110 extend between annular endwalls 103 and 105 that define a portion 106 (FIG. 5) of the mainstream hot combustion gas flow path 107 for receiving the flow of hot combustion gases 19 from the engine combustor 18. The rotor blades 132 of the turbine rotor 130 project radially outward from a turbine rotor platform 134 that is coupled to a turbine disk 136, which in turn circumscribes a shaft (not shown). During operation, the hot combustion gases 19 flow past the axially spaced circumferential rows of vanes 120 and rotor blades 132 to drive the rotor blades 132 and the associated turbine rotor 130 of the turbine 20 for power extraction. Other embodiments of the gas turbine engine 12 and turbine section 100 may be differently arranged. The gas turbine engine 12 and turbine section 100 thereof have an overall construction and operation that is conventional. The bi-cast turbine nozzle may be fixedly mounted between the combustor and first stage rotor of the gas turbine engine 12. Although it is believed that the bi-cast turbine nozzle 110 constructed in accordance with exemplary embodiments of the present invention will be particularly advantageous when used between the combustor and first stage rotor of a turbine engine, it should be understood that bi-cast nozzles constructed in accordance with the present invention can be used at other locations in a gas turbine engine.

Figure 3:
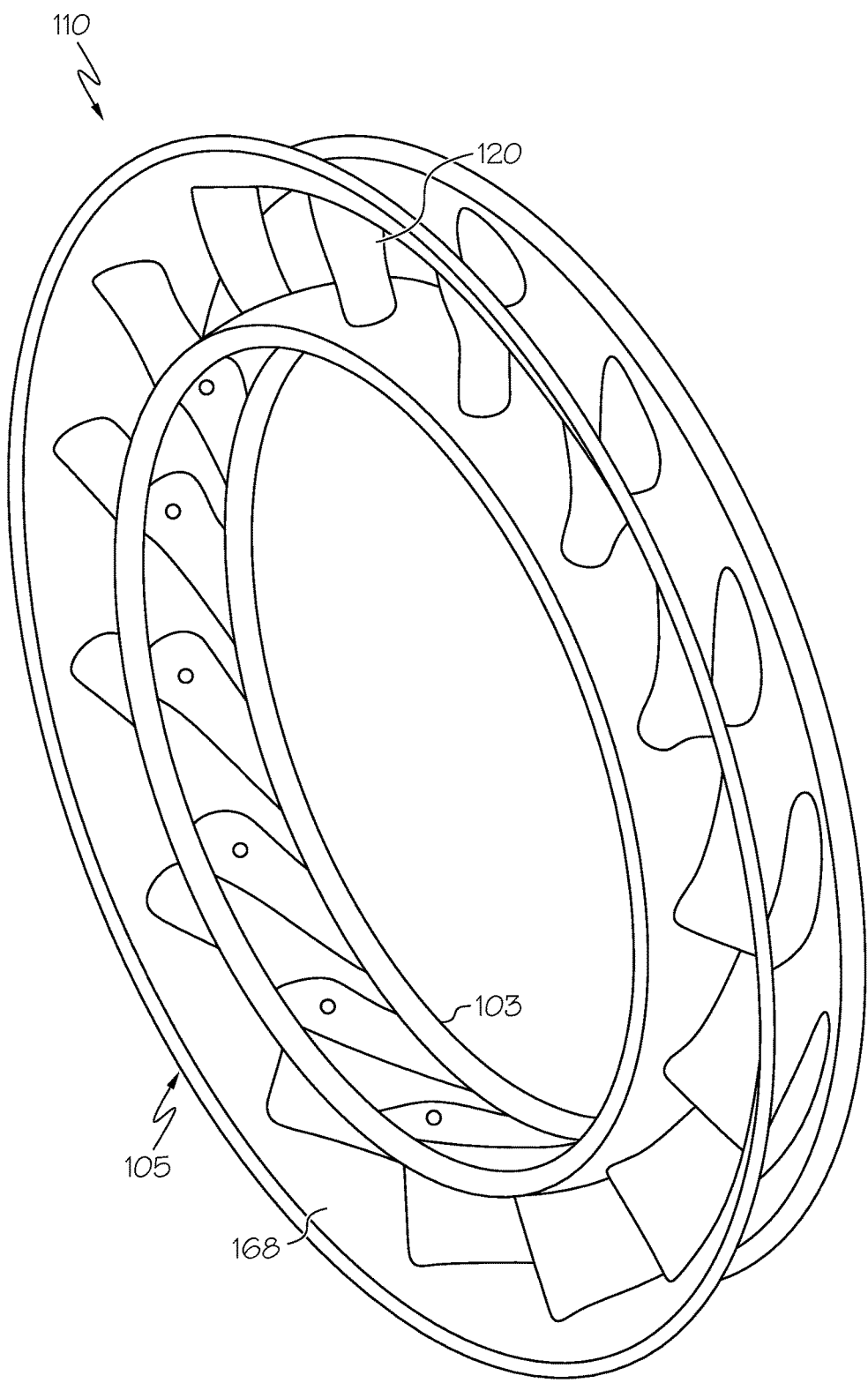
FIG. 3 is an isometric view of an exemplary bi-cast turbine nozzle that may be used in the turbine section of FIG. 2.
Figure 4:
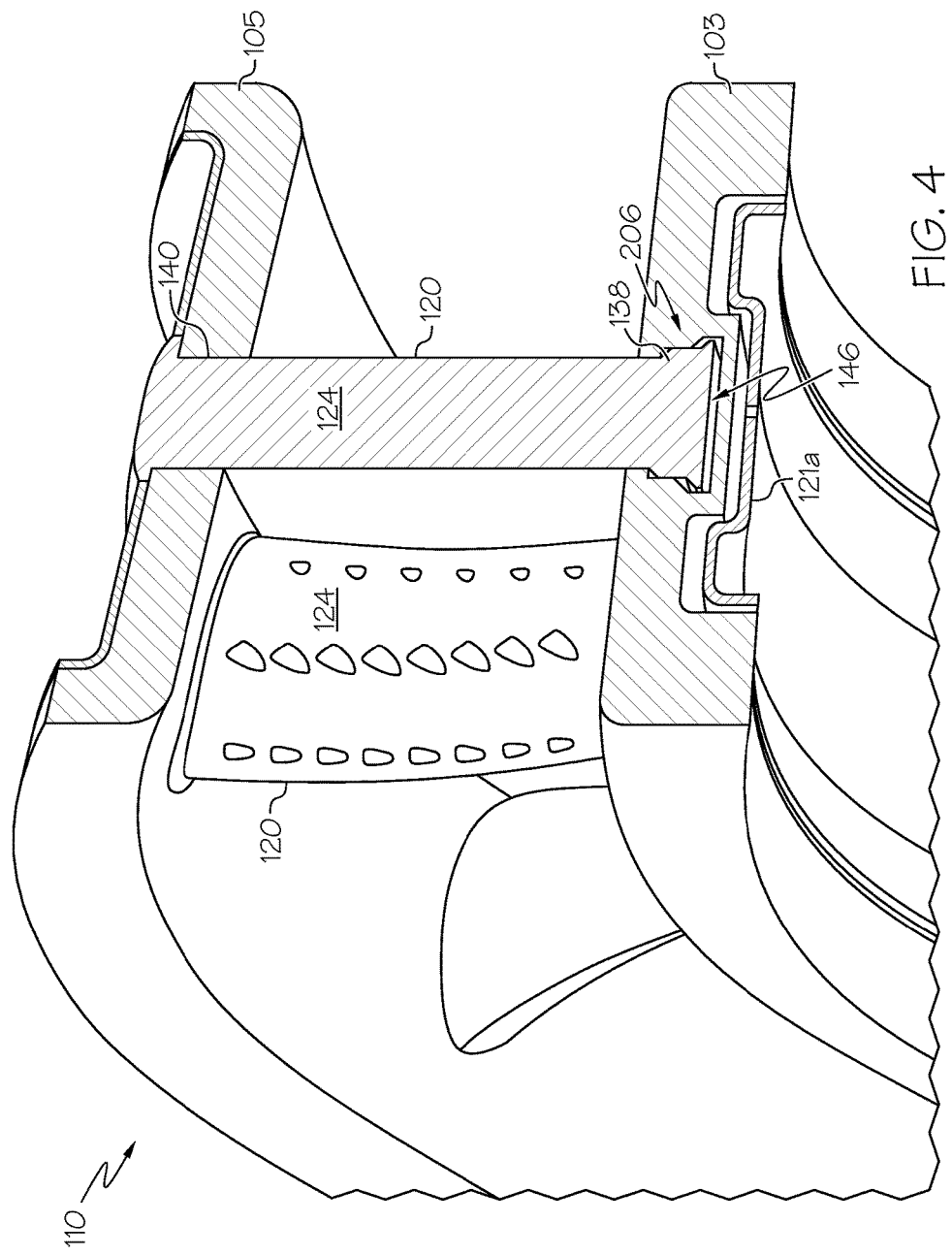
FIG. 4 is a schematic view of a suction side of a portion of the bi-cast turbine nozzle of FIG. 3, the bi-cast turbine nozzle comprising an outer endwall, an inner endwall circumscribed by the outer endwall and spaced therefrom to define a portion of a combustion gas flow path in the gas turbine engine (not shown in FIG. 4), and a plurality of stationary airfoils (vanes) (only three are illustrated) disposed in an annular array between the outer and inner endwalls, each vane having an inner end portion forming a slip joint with the (adjacent) inner endwall, the inner end portion disposed in a space in the inner endwall and the outer end portion anchored in the outer endwall.

FIG. 3 is an isometric view of the bi-cast turbine nozzle 110 of FIG. 2, in accordance with exemplary embodiments of the present invention. FIG. 4 is a schematic view of a portion of the bi-cast turbine nozzle 110 of FIG. 3. The bi-cast turbine nozzle 110 comprises a plurality of vanes 120 arranged in an annular array between a pair of endwalls 103 and 105. The endwalls 103 and 105 have a generally cylindrical main or body section 168 (FIG. 3). The endwalls 103 and 105 are positioned in a concentric relationship with the vanes 120 disposed in the radially extending annular array between the endwalls. The pair of endwalls comprises an inner endwall 103 and an outer endwall 105 that oppose each other. The outer endwall 105 circumscribes the inner endwall 103 and is spaced therefrom to define the portion 106 of the combustion gas flow path 107 (FIG. 2) in the gas turbine engine. The plurality of vanes is configured to be disposed in the portion 106 of the combustion gas flow path 107. Each of the vanes 120 has a generally concave pressure sidewall 122 (FIGS. 5 and 6) and a generally convex suction sidewall 124 (FIGS. 4 and 5) opposed thereto. The sidewalls 122 and 124 interconnect a leading or upstream edge 126 and a trailing or downstream edge 128 (FIGS. 2 and 6) of each vane. Each vane comprises a pair of end portions. The pair of end portions comprises an inner end portion 138 and an opposing outer end portion 140.

As noted above, the bi-cast turbine nozzle may be manufactured by a known bi-cast method. The stationary airfoils (vanes) 120 are cast separately from the inner and outer endwalls 103 and 105. The endwalls may be respectively cast around the inner and outer end portions 138 and 140 of the prefabricated vanes 120. More particularly, the inner endwall 103 is cast around the inner end portion 138 of the vane and the outer endwall 105 is cast around the outer end portion 140 of the vane. An advantage to the bi-cast method is that the vanes 120 and endwalls 103 and 105 can each be formed from materials having different material compositions and crystallographic structures. For example, the vanes 120 in the bi-cast turbine nozzle may be formed of metal and/or ceramic materials that can withstand the extremely high operating temperatures (greater than about 2800° Fahrenheit) to which they are exposed in the gas turbine engine. For example, the vanes 120 may be cast as a single crystal of a nickel-alloy metal. The vanes may be cast by methods well known in the art. As the endwalls 103 and 105 are subjected to operating temperatures that differ somewhat from the operating temperatures to which the vanes 120 are subjected, the endwalls 103 and 105 can advantageously be made of materials which are different from the materials of the vanes as hereinafter described. For example, the inner and outer endwalls 103 and 105 may be formed of a nickel superalloy, such as MAR M247. Although the endwalls 103 and 105 are described as cast of the same metal, they could be formed of different metals, if desired. Therefore, it is to be understood that the inner endwall may be cast of one metal and the outer endwall cast of another metal. The vanes 120 may be formed of a third metal or ceramic material in order to optimize the operating characteristics of the bi-cast turbine nozzle. In another embodiment, the endwalls and vanes may comprise the same material.

Referring again specifically to FIG. 4, the inner end portion 138 of the illustrated vane is slip coupled by a slip joint 206 with the adjacent inner endwall 103. It should be noted that the outer end portion 140 of the vane 120 is mechanically anchored in the outer endwall 105 by methods well known in the art. This arrangement prevents the vanes 120 from moving out of engagement with the opposing endwall as the vane moves within the conformity of the inner endwall at the slip joints. More particularly, the outer end portions of each of the vanes 120 are anchored in and held against axial and radial movement relative to the outer endwall. While the slip joints are illustrated in FIG. 4 as being between the inner endwall and the inner end portion of the vane, it is to be understood that the slip joints may be between the outer endwall and the outer end portions of the vanes if desired, using the inner endwall instead of the outer endwall as the mechanical anchor. Each of the vanes in the annular array of the bi-cast turbine nozzle is slip coupled to an endwall of the pair of endwalls with the slip joint between the end portion and an adjacent endwall of the pair of endwalls and the opposing end portion anchored to the other endwall of the pair of endwalls. An impingement baffle 121a is disposed exteriorly of endwall 103 and includes a plurality of openings 123a and impingement baffle 121b is disposed exteriorly of endwall 105 and includes a plurality of openings 123b (FIGS. 2 and 6), for purposes as hereinafter described.

Figure 5:
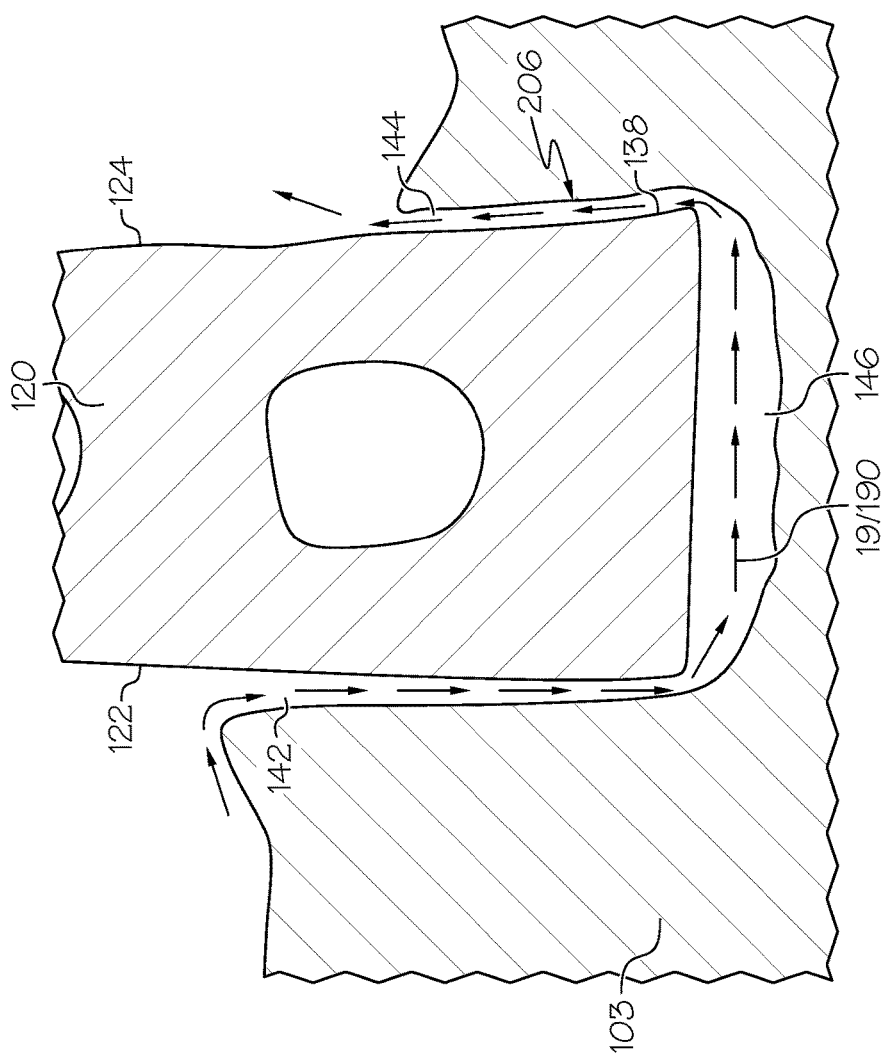
FIG. 5 is a schematic view of the inner endwall slip joint portion of the bi-cast turbine nozzle of FIG. 3, depicting hot combustion gas ingestion flow (and alternatively, diluted and cooled combustion gas flow) through the slip joint between the end portion of a single vane and the endwall (in this depiction, between the inner end portion and the inner endwall) and associated space in the endwall, from the pressure side of the vane, under the vane footprint, and onto the suction side of the vane along a combustion gas flow path.

During operation of the gas turbine engine, as known in the art, the vanes 120 are exposed to hot combustion gas 19 (FIG. 1) that comes from the combustor 18 (FIG. 1). The hot combustion gases from the combustor are directed against the annular array of stationary airfoils (vanes) 120 that extend between the inner endwall and the outer endwall. When the inner and outer endwalls 103 and 105 and vanes 120 are at ambient temperatures, the slip joints 206 are tightly closed. However, during engine transient operating conditions, the vanes 120 and inner and outer endwalls 103 and 105 may heat up or cool down at different rates and be at different temperatures, resulting in different levels of radial displacement for the vanes and endwalls. The vanes 120 may be allowed to become hotter than the inner and outer endwalls 103 and 105 because the vane material may be able to sustain higher temperatures than the endwall material, or because the vanes are exposed to a hotter combustion gas temperature than the endwalls. Also, under transient engine operation, the vane temperature will respond faster to combustion gas temperature changes (cool down or heat up) than endwalls, due to a difference in thermal inertia between the vanes and the endwalls. As such, the vane radial displacement may be different than the endwalls due to different temperature level and/or different coefficient of thermal expansions owing to different materials being used for vanes and endwalls. As this occurs, the vanes are free to move in the radial direction (relative to the inner endwall) through the slip joints, without resulting in compressive or tensile stress buildup. At the same time, the outer endwall may be at a different temperature than the inner endwall during transient operation, and as the outer endwall is at a different radial position than the inner endwall, the radial displacement of the outer endwall may be different from that of the inner endwall. As the vanes are mechanically anchored to the outer endwall (in the illustrated embodiment), and accordingly move radially with the outer endwall, the vanes move relative to the inner endwall through the slip joints. This relative movement in the radial direction between the vanes and inner endwall results in opening the slip joints during engine operation. The slip joint 206 in the open condition as depicted in FIG. 5 comprises a gap 142 between the vane pressure sidewall 122 and the opposing surface of the adjacent endwall and an opposing gap 144 between the vane suction sidewall 124 and the opposing surface of the adjacent endwall, permitting the vane to slide radially into and out of a space 146 (FIGS. 4 and 5) in the adjacent inner endwall 103. The space 146 is underneath the vane footprint as depicted in FIGS. 4 and 5. Again, while the slip joint 206 is illustrated in FIG. 5 as being between the inner endwall 103 and the inner end portion 138 of the vane 120, it is to be understood that the slip joint(s) may be between the outer endwall 105 and the outer end portions 140 of the vanes if desired, using the inner endwall 103 instead of the outer endwall as the mechanical anchor. As noted previously, the slip joints 206 in the bi-cast turbine nozzle accommodate differential thermal expansion of the vanes relative to the endwalls.

Still referring to FIG. 5, the hot combustion gas 19 is ingested into the slip joint 206 and flows along the portion 106 (FIG. 2) from a pressure side (FIG. 6) of the vane, into the associated space 146 in the endwall adjacent the vane end portion, and onto a suction side (FIG. 4) (the suction sidewall 124) of the vane because of the pressure being higher on the pressure side of the vane compared to the suction side of the vane. More particularly, the hot combustion gas 19 flows into the gap 142 between the pressure sidewall and the opposing surface of the adjacent endwall, through the space 146 underneath the vane footprint, and into the opposing gap 144 between the suction sidewall and the opposing surface of the adjacent endwall. As noted previously, this hot gas ingestion through the slip joint 206 would result in vane and endwall oxidation and material recession, resulting in further increases in the size of the gaps 142 and 144, if the slip joints were not cooled according to exemplary embodiments of the present invention as described herein.

Figure 6:
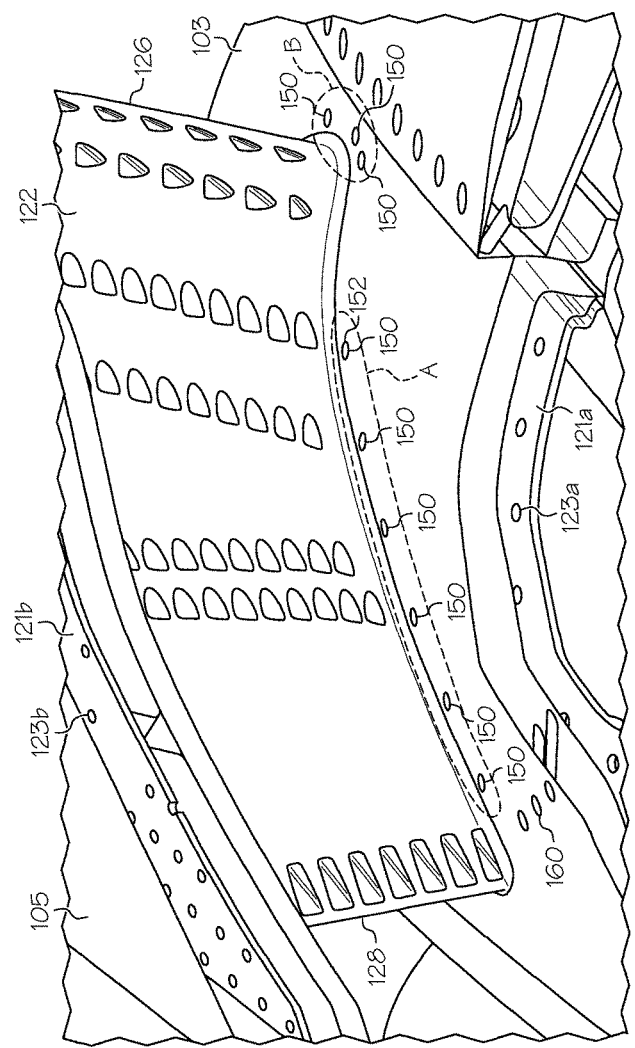
FIG. 6 is a schematic view of a pressure side of a portion of the bi-cast turbine nozzle according to exemplary embodiments of the present invention along with portions of a combustor plenum, the bi-cast turbine nozzle comprising a plurality of cooling holes and a plurality of film cooling holes defined through the inner endwall, the plurality of cooling holes adjacent the periphery of the slip joint along a pressure sidewall and in proximity to the leading edge of the vane in the bi-cast turbine nozzle.

Referring now to FIG. 6, in accordance with exemplary embodiments of the present invention, the bi-cast turbine nozzle 110 further comprises a plurality of cooling holes 150 defined through an endwall (endwall 103 in FIG. 6). The plurality of cooling holes 150 are disposed adjacent the periphery of the slip joint 206, on the pressure side 122 of the vane 120. The cooling holes 150 are formed in the endwall 103, along the pressure sidewall of the vane and in proximity to the leading edge 126 of the vane. The plurality of cooling holes in endwall 103 comprise a first set (encircled region A of FIG. 6) of cooling holes along the pressure sidewall of the vane and a second set (encircled region B of FIG. 6) of cooling holes in proximity to the leading edge 126 of the vane. Each cooling hole of the plurality of cooling holes 150 has an outlet 152 opening onto the endwall 103 in proximity to the slip joint 206. The cooling holes 150 are selectively located such that the cooling gas 76 exiting therefrom mixes with the combustion gas 19 and follows the combustion gas flow path (indicated by arrows in FIG. 5) through the slip joint, as hereinafter described. More particularly, the cooling holes are selectively located so that the cooling gas flow 76 (FIG. 1) ejected through the plurality of cooling holes 150 mixes with the hot combustion gas ingestion flow 19 that flows through the slip joints, thereby reducing the temperature of the combustion gas 19 that is ingested through the slip joints 206 in the bi-cast turbine nozzle. While the plurality of cooling holes 150 are described as defined through inner endwall 103, it is to be understood that the plurality of cooling holes 150 may alternatively be defined through outer endwall 105 when the slip joints in the bi-cast turbine nozzle are between the outer endwall and the outer end portions of the vanes and the inner endwall is used as the mechanical anchor.

The plurality of cooling holes 150 may be formed through the endwall by methods known in the art. For example, electrode discharge machining (EDM) may be used to form the plurality of cooling holes through the endwall. The cooling holes may be generally cylindrical in cross-section, inclined at the shallowest possible angle with respect to the endwall surface. The cooling holes may have other cross-sectional shapes. While a specific number of cooling holes, cooling hole geometries, and cooling hole configurations are illustrated, it is to be understood that the exemplary embodiments as herein described are not limited to any particular number of cooling holes, geometries and/or configurations. For example, the cooling hole shape, hole spacing between cooling holes (center of one film cooling hole to the center of the sequential film cooling hole), the number of cooling holes, or the like may be varied depending upon the particular application. In addition, while the cooling gas may allow higher operating temperatures of the gas turbine engine and the bi-cast turbine nozzle, the cooling gas may also be parasitic to the engine, as it is not directly used to produce power, e.g., thrust. Therefore, the amount of cooling gas directed to the slip joint should be optimized to an amount sufficient to cool the slip joint to substantially prevent oxidation damage without using more than necessary.

Still referring to FIG. 6, the bi-cast turbine nozzle further comprises a plurality of endwall film cooling holes 160 defined through the endwalls 103 and 105, in proximity to the trailing edge 128 of the vane. The endwall film cooling holes are on the pressure side of the vane The cooling holes 150 (encircled region B) help to mitigate lift-off of a film layer of cooling gas formed from the cooling gas 76 exiting the plurality of endwall film cooling holes 160. As known in the art, a horse-shoe vortex is formed on the endwall in the close vicinity of the intersection between the vane leading edge 126 and the endwall. The horse-shoe vortex tends to migrate from the pressure side of the vane toward the suction side of the vane along the endwall, causing the lift-off of the film cooling layer along the endwall. The cooling gas ejected from cooling holes 150 in proximity of the leading edge (i.e., cooling holes 150 in encircled region B) tend to substantially prevent the formation of the horse-shoe vortex due to the introduction of high momentum cooling jets into the approaching hot combustion gas flow and as such, mitigate the lift-off of the film layer of cooling gas along the endwall.

Figure 7:
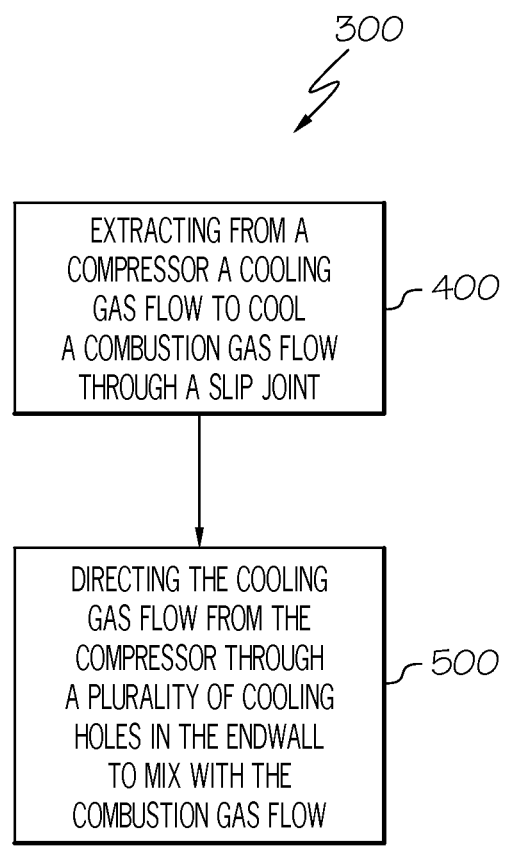
FIG. 7 is a flow diagram of a method for cooling a slip joint in a bi-cast turbine nozzle, according to an exemplary embodiment of the present invention.

Referring now to FIGS. 1, 6, and 7, according to exemplary embodiments of the present invention, a method 300 for cooling the slip joint in the bi-cast turbine nozzle begins by extracting from the compressor of the gas turbine engine a cooling gas flow suitable in quantity to sufficiently cool the combustion gas flow through the slip joint (step 400). The quantity of cooling gas is determined by the maximum allowable vane and endwall metal surface temperatures below which oxidation damage is substantially prevented (in the absence of any oxidation protection coatings). The vane and endwall metal temperature levels proximate the slip joint are mainly governed by the heat input from the hot combustion gas ingested through the slip joint. A known high fidelity three-dimensional flow and a conjugate heat transfer analysis tool are used to predict the metal temperatures proximate the slip joint and the cooling gas quantity suitable to substantially ensure that the vane and endwall metal temperatures are maintained at temperature levels below which oxidation damage is substantially prevented.

Still referring to FIGS. 1, 6, and 7 and referring again to FIG. 5, according to exemplary embodiments of the present invention, the method 300 for cooling a slip joint in a bi-cast turbine nozzle continues by directing the cooling gas flow from the compressor through the plurality of cooling holes defined through the endwall to mix with the combustion gas flow through the slip joint (step 500). More particularly, as noted previously, compressed air 23 may be extracted from the exit 21 of the compressor 16 and flows into the combustor plenum 40. A portion (the cooling gas 76) of the compressed air flows from the combustor plenum to the bi-cast turbine nozzle 110 in the turbine section 100 (FIGS. 1 and 2). Other configurations for supplying the cooling gas to the bi-cast turbine nozzle may be used. The cooling gas 76 flows through the plurality of openings 123a in impingement baffle 121a to impinge on an inside surface of endwall 103 and through the plurality of openings 123b in impingement baffle 121b to impinge on the inside surface of endwall 105 (FIGS. 2 and 6). The cooling gas 76 is subsequently ejected through the endwall film cooling holes 160 onto the external surface of the endwalls 103 and 105. After impingement, the cooling gas is also ejected from the outlet 152 of each cooling hole of the plurality of cooling holes 150 defined through the endwall As noted previously, the illustrated outlet 152 opens onto the endwall 103 (more particularly, the external surface of endwall 103) in proximity to the slip joint 206. Also as noted previously, the cooling holes are selectively located so that the cooling gas flow 76 ejected through the plurality of cooling holes 150 mixes with the hot combustion gas ingestion flow 19 that subsequently flows through the slip joints, thereby reducing the temperature of the combustion gas ingested through the slip joints. The mixture of cooling gas 76 and hot combustion gas 19 results in "diluted and cooled combustion gas" 190 (FIG. 5). As noted previously, while the plurality of cooling holes 150 are described as defined through inner endwall 103, it is to be understood that the plurality of cooling holes 150 may alternatively be defined through outer endwall 105 when the slip joints in the bi-cast turbine nozzle are between the outer endwall and the outer end portions of the vanes and the inner endwall is used as the mechanical anchor. Slip joints between the outer endwall 105 and the outer end portions of the vanes are cooled in the same manner as slip joints between the inner endwall 103 and inner end portions of the vanes.

Following the combustion gas flow path 106 (FIG. 5), the diluted and cooled combustion gas 190 passes through the open slip joint between the end portion of the vanes and the adjacent endwall in the bi-cast turbine nozzle in the same manner as previously described for combustion gas 19. The diluted and cooled combustion gas 190 generates high heat transfer coefficient on the adjacent surfaces (due to a high Reynolds number) that cools (relative to turbine nozzles without slip joint cooling) both the end portion of the vanes and the adjacent endwall surfaces. The diluted and cooled combustion gas 190 film cools the slip joint 206 (including the endwall downstream of the ejection point). Significant reductions in temperature at the slip joint and on the aft side of the endwall (i.e., the suction side) may also be realized relative to turbine nozzles without slip joint cooling, thereby substantially preventing oxidation damage at the slip joint. Substantial prevention of oxidation damage at the slip joints substantially insures the size of the gaps 142 and 144 does not increase over time, thereby minimizing combustion gas ingestion therethrough. In addition, an overall increase in cooling effectiveness of the bi-cast turbine nozzle is realized.

From the foregoing, it is to be appreciated that the bi-cast turbine nozzles and methods for cooling slip joints therein are provided. Cooling of the slip joints in the bi-cast turbine nozzles helps substantially prevent aerodynamic performance degradation and oxidation damage at the slip joint, thereby decreasing material recession and contributing to longer operative life of the bi-cast turbine nozzles. Cooling film blow-off may also be reduced.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A bi-cast turbine nozzle comprising:
an endwall;
a vane coupled to the endwall, the vane comprising:
a leading edge and a trailing edge interconnected by a pressure sidewall and a suction sidewall; and
an end portion;
a slip joint between the end portion and the endwall, the vane movable relative to the slip joint to define a flow passage that extends from the pressure sidewall through a space to the suction sidewall, the space defined between the endwall and the end portion; and a plurality of cooling holes defined through the endwall, the plurality of cooling holes including a discrete first plurality of cooling holes and a discrete second plurality of cooling holes, the discrete first plurality of cooling holes disposed adjacent the periphery of the slip joint along the pressure sidewall of the vane and extend along the pressure sidewall in proximity to the leading edge toward the trailing edge, the discrete second plurality of cooling holes disposed at the leading edge of the vane and the discrete second plurality of cooling holes are spaced apart from the first plurality of cooling holes by a portion of the endwall along the pressure sidewall, the second plurality of cooling holes mitigates lift-off of a film layer of cooling gas formed from cooling gas exiting a plurality of endwall film cooling holes, and each cooling hole of the discrete first plurality of cooling holes and the discrete second plurality of cooling holes has an outlet that opens onto the endwall in proximity to the slip joint and ejects a cooling fluid that flows into the flow passage defined by the slip joint.

2. The bi-cast turbine nozzle of claim 1, wherein the plurality of cooling holes is in fluid communication between a compressor and a combustion gas flow path of a gas turbine engine.

3. The bi-cast turbine nozzle of claim 1, wherein the plurality of cooling holes directs the cooling fluid to mix with a combustion gas flow and follow the combustion gas flow path through the flow passage defined by the slip joint.

4. The bi-cast turbine nozzle of claim 1, further comprising the plurality of endwall film cooling holes defined through the endwall in proximity to the trailing edge of the vane.

5. A bi-cast turbine nozzle for a gas turbine engine, the bi-cast turbine nozzle comprising:
a pair of endwalls;
a plurality of vanes extending between the pair of endwalls, each vane of the plurality of vanes comprising:
a leading edge and a trailing edge interconnected by a pressure sidewall and a suction sidewall; and
an end portion and an opposing end portion;
a slip joint between the end portion and an adjacent endwall of the pair of endwalls and the opposing end portion anchored to the other endwall of the pair of endwalls, the vane movable relative to the slip joint to define a flow passage that extends from the pressure sidewall through a space to the suction sidewall, the space defined between the endwall and the end portion;
a plurality of cooling holes defined through the adjacent endwall, the plurality of cooling holes including a discrete first plurality of cooling holes and a discrete second plurality of cooling holes, the discrete first plurality of cooling holes disposed adjacent the periphery of the slip joint along the pressure sidewall of the vane and extend along the pressure sidewall in proximity to the leading edge toward the trailing edge of the vane, the discrete second plurality of cooling holes disposed at the leading edge of the vane and the second plurality of cooling holes spaced apart from the discrete first plurality of cooling holes by a portion of the endwall along the pressure sidewall of the vane, the discrete second plurality of cooling holes mitigates lift-off of a film layer of cooling gas formed from cooling gas exiting a plurality of endwall film cooling holes, each cooling hole of the discrete first plurality of cooling holes and the discrete second plurality of cooling holes has an outlet that opens onto the endwall in proximity to the slip joint and ejects a cooling fluid that flows into the flow passage defined by the slip joint;
an impingement baffle disposed exteriorly of at least one of the pair of endwalls, the impingement baffle including a plurality of openings in fluid communication with the plurality of cooling holes to provide the plurality of cooling holes with a cooling gas;
the plurality of endwall film cooling holes defined through the endwall in proximity to the trailing edge of the vane, the plurality of endwall film cooling holes extending outwardly from the trailing edge in a row; and
wherein the cooling gas mixes with a combustion gas flow prior to entering the flow passage defined by the slip joint.

6. The bi-cast turbine nozzle of claim 5, wherein the vane is in an annular array of vanes extending between the pair of endwalls, the slip joint between the end portion of each vane in the annular array and the adjacent endwall.

7. The bi-cast turbine nozzle of claim 5, wherein the plurality of cooling holes is in fluid communication between a compressor and a combustion gas flow path of the gas turbine engine.

8. A method for cooling a slip joint in a bi-cast turbine nozzle comprising a vane coupled to an endwall by the slip joint, the method comprising the steps of:
extracting from an exit of a compressor of a gas turbine engine a cooling gas flow suitable in quantity to cool a combustion gas flow through the slip joint, the combustion gas flowing through a flow passage defined between the vane and the slip joint that extends from a pressure sidewall of the vane through a space to a suction sidewall of the vane, the space defined between the endwall and an end portion of the vane;
directing the cooling gas flow from an outlet of each cooling hole of a plurality of cooling holes that opens onto the endwall in proximity to the slip joint to mix with the combustion gas flow prior to flowing through the flow passage from the pressure sidewall of the vane, through the space to the suction sidewall of the vane, the plurality of cooling holes including a discrete first plurality of cooling holes and a discrete second plurality of cooling holes defined in the endwall, the discrete first plurality of cooling holes disposed adjacent the periphery of the slip joint along a pressure sidewall and extending along the pressure sidewall in proximity to a leading edge toward a trailing edge of the vane; and
mitigating lift-off of a film layer of cooling gas formed from cooling gas exiting a plurality of endwall film cooling holes with the discrete second plurality of cooling holes, the second plurality of cooling holes disposed at the leading edge of the vane and the discrete second plurality of cooling holes are spaced apart from the discrete first plurality of cooling holes by a portion of the endwall along the pressure sidewall.

9. The method of claim 8, wherein the step of directing the cooling gas flow from the outlet of each cooling hole of the plurality of cooling holes comprises directing the cooling gas flow through the outlet of the plurality of cooling holes and into a pressure side gap of the slip joint to mix with and follow the combustion gas flow through the slip joint.

\* \* \* \* \*